(12) United States Patent
Will et al.

(10) Patent No.: US 9,569,950 B1
(45) Date of Patent: Feb. 14, 2017

(54) LOST AND FOUND SYSTEM FOR PERSONAL ITEMS

(71) Applicant: EIDTAG LLC, Redondo Beach, CA (US)

(72) Inventors: Richard Will, Manhattan Beach, CA (US); Jill E. Will, Manhattan Beach, CA (US); Justin Ottinger, Manhattan Beach, CA (US)

(73) Assignee: EIDTAG, LLC, Redondo Beach, CA (US)

( * ) Notice: Subject to any disclaimer, the term of this patent is extended or adjusted under 35 U.S.C. 154(b) by 0 days.

(21) Appl. No.: 14/983,444

(22) Filed: Dec. 29, 2015

(51) Int. Cl.
- *H04M 1/64* (2006.01)
- *H04M 11/00* (2006.01)
- *G08B 21/24* (2006.01)
- *H04M 3/493* (2006.01)
- *H04L 12/58* (2006.01)

(52) U.S. Cl.
CPC ............... *G08B 21/24* (2013.01); *H04L 51/18* (2013.01); *H04M 3/493* (2013.01)

(58) Field of Classification Search
CPC ................................................... H04M 3/493
See application file for complete search history.

(56) References Cited

U.S. PATENT DOCUMENTS

| | | | | |
|---|---|---|---|---|
| 5,036,610 | A * | 8/1991 | Fehr | G09F 3/00 283/70 |
| 5,570,081 | A * | 10/1996 | Holstrom | G08B 13/14 283/74 |
| 5,752,335 | A * | 5/1998 | Shimogori | A01K 11/00 40/300 |
| 5,878,116 | A * | 3/1999 | Scott | G08B 21/24 379/201.09 |
| 5,955,953 | A * | 9/1999 | Hanson | A01K 11/00 340/573.1 |
| 6,950,024 | B2 * | 9/2005 | Wunderlick | G09F 7/165 340/568.1 |
| 7,523,871 | B1 * | 4/2009 | Wilson | G06Q 20/346 235/487 |
| 8,395,506 | B2 * | 3/2013 | Elledge | G06F 21/88 235/375 |
| 8,812,476 | B2 * | 8/2014 | Hope | G06F 17/30876 707/706 |
| 2008/0111697 | A1 * | 5/2008 | Hill | A01K 15/021 340/573.3 |
| 2012/0225633 | A1 * | 9/2012 | Nichols | G08B 13/1427 455/404.1 |

(Continued)

*Primary Examiner* — Joseph T Phan
(74) *Attorney, Agent, or Firm* — Fulwider Patton LLP

(57) ABSTRACT

A system for facilitating the recovery of a user's lost item is provided that makes use of tags the user applies to the item and an interactive voice response (IVR) system. When a finder of the item calls a phone number displayed on the tag, the finder is directed to the IVR system. The finder is prompted to identify the item by providing a unique code displayed on the tag. Once the finder provides the unique code, a server in the system receives the phone number and unique code from the IVR system and verifies if there is a user associated with the tag. If so, the server sends a response back to the IVR system to obtain the finder's message indicating the location of the item. After the finder leaves a message, the message is transmitted automatically to the user in real time.

20 Claims, 9 Drawing Sheets

(56) References Cited

U.S. PATENT DOCUMENTS

2013/0015971 A1\*  1/2013  Caporizzo .......... G08B 13/1427
                                                340/539.32
2014/0079209 A1\*  3/2014  Flockhart ............ H04M 3/5232
                                                379/265.09

\* cited by examiner

FIG 3

LOST AND FOUND SYSTEM FOR PERSONAL ITEMS

BACKGROUND

The present invention generally relates to a lost and found system for personal items, and more particularly relates to a system for facilitating the recovery of a lost item of a user using interactive voice response technology.

The problem of locating lost items has troubled people for years. The typical situation arises when people misplace their car key, house key, cell phone, wallet or purse. After coming to terms with the momentary shock that such a loss may evoke, people generally find themselves checking every possible location where the lost item could be, or calling or visiting a myriad of places where they recently went, many times to no avail. The sheer number of portable objects that exist in the world today, ranging from jewelry and electronic devices to vehicles and luggage, has made this problem all the more widespread. Consequently, a need has arisen for an improved system that assists people in recovering their missing items.

Some people have attempted to prevent permanent loss of their items by affixing their contact information to their items for finders to call. The idea behind the approach is that if an owner of an item accidentally misplaces their item in a public place, a finder or passerby who happens to come across the item can notify the owner of the missing item. However, this approach is unfavorable to owners or finders who desire to maintain their privacy. For example, owners may not want to leave their phone number or address in public view for other people to see, and finders who call owners to report missing items may not want their phone number to appear on the owners' caller ID.

Alternatively, many people have attempted to use tracking devices and mobile applications that use cellular, global position satellite (GPS), or Bluetooth technology to assist them in locating their lost items. Typical examples of tracking devices include tags having wireless chips that, when affixed to lost objects, communicate their location to a software application on a mobile device. However, the use of tracking devices and mobile applications are not always dependable. For instance, tracking devices that use Bluetooth technology typically only work if the owner is in close proximity to the lost item. If the owner lost the item in a location not proximal to the owner, such as on a moving bus or at a far-away destination, then the tracking device will not operate.

Furthermore, the location of the missing object itself may interfere with the tracking device or software application. For example, if the tracking device uses GPS technology and the lost item is located in an area with questionable satellite reception, such as an underground subway, then the owner may be unable to find the lost item because the GPS location of the object will be difficult to pinpoint. Moreover, if the lost object is the tracking device or carrier of the software application itself, such as a smartphone or tablet, then the technology is evidently useless for finding the lost item. Additionally, low battery power and sporadic wireless connection failures may also render the tracking device ineffectual.

Hence, there is a need for a system that facilitates the recovery of an owner's lost item while protecting the privacy of owners and finders. There is a further need for a system that facilitates the recovery of a lost item without depending on wireless tracking devices or software applications that use GPS or Bluetooth technology. The present invention meets this and other needs.

SUMMARY OF THE INVENTION

The present invention provides for a lost and found system for personal items, or more particularly, a system for facilitating the recovery of a lost item. In a preferred embodiment of the present invention, one or more tags are provided to a subscriber of the lost and found system, such as a user, that are configured to be attached or adhered to any portable item of the subscriber. Each tag includes a phone number and a unique code for identifying the tag. If the user were to lose a tagged item, and a finder happens to locate the tagged item, the system allows for the finder to easily report the location of the lost item and allows for the user to easily recover the lost item from the finder's message.

Specifically, the lost and found system of the present invention facilitates the recovery of lost items by making use of a web application that interacts with a separately provided interactive voice response (IVR) system. As used herein, an IVR system is an automated attendant telephone system or other communication system that interactively responds to a finder using data extracted from one or more databases in communication with a web server running the web application. The IVR system receives this data through an IVR application programming interface (API), which serves as the communications interface through which the IVR system communicates with the web server and the one or more databases. In the lost and found system, the IVR system transmits information received from a finder of a user's lost item to the one or more databases through the IVR API Likewise, the IVR system receives data accessed from the one or more databases through the IVR API to interactively respond to the finder.

The IVR system is configurably associated with one or more telephone numbers that a finder can call to access the IVR system. The IVR system is configurable to prompt the finder with one or more questions, to receive answers to the one or more questions from the finder, and to interactively respond to the finder after communicating with one or more databases using the IVR API. In the lost and found system, the IVR system is configurable to ask a finder who calls the IVR system to provide the unique code of the tag affixed to the user's lost item, to receive the unique code from the finder, to transmit the unique code to the web server through the IVR API to be processed and compared against the one or more databases, to receive a response processed from the comparison with the one or more databases through the IVR API, and to prompt the finder to leave a voice message reporting the location of the lost item or to re-enter the correct unique code depending on the response received. The IVR system is further configurable to transmit the finder's recorded voice message to the web server using the IVR API to be stored in a file system for the web application, where a reference to its file location is stored in the one or more databases.

The IVR system is also configurable to make calls to users and to interactively communicate with users based on data obtained from the one or more databases. In the lost and found system, the IVR system is configurable to receive a phone number of a user from the one or more databases through the IVR API, to automatically call the phone number of the user, and to play the finder's recorded voice message in the form of an audio file for the user, thereby reporting the finder's information to the user regarding the location of the user's missing item. Moreover, the lost and found system transmits a written message to the user informing the user that the missing item has been located and including the audio file of the finder's recorded voice message. For example, the lost and found system may send the user an e-mail or text including the audio file as a hyperlink or attachment, which, when activated by the user, plays the finder's recorded voice message in WAV format. Alternatively, the IVR system in the lost and found system may be configurable to receive a transcribed version of the audio file from the database using the IVR API and to send the transcribed version of the audio file in the form of a written message to the user. In some cases, the IVR system may itself be configurable to transcribe an audio file to be sent to the user as a written message.

According to the preferred embodiment of the present invention, a finder of a user's lost item calls the phone number displayed on the tag affixed to the item. When the finder calls the phone number, the finder is directed to the IVR system. The finder is then prompted by the IVR system to identify the lost tagged item by providing the unique code displayed on the tag, for example, through telephone keypad input. Once the finder provides the unique code of the tag to the IVR system, a server in the lost and found system receives the phone number and unique code from the IVR system through the IVR API. The phone number and unique code are combined to form the unique identifier of the tag, which is compared against a database containing unique identifiers to determine if there is an active matching tag. If the unique identifier of the tag is found in the database, the server sends a response back to the IVR system using the IVR API to obtain and record the finder's message indicating the location of the found item.

Once the finder leaves a message with the IVR system indicating the location of the item, the server receives the finder's message in the form of an audio file through the IVR API, stores it in its memory, and stores a path to its file location in the database. Immediately afterwards, the server accesses the phone number associated with the active tag for the found item and transmits it to the IVR system through the IVR API. Where the phone number associated with the active tag is that of the user itself, the IVR system receives the user's phone number, calls the user, and automatically plays the recorded finder's message to the user reporting the location of the missing item. Alternatively, where the phone number associated with the active tag is that of a notification recipient that the user designated as the person to receive the recorded finder's message on the user's behalf, the server accesses the phone number of the notification recipient, and the IVR system calls and plays the recorded finder's message to the notification recipient. Additionally, the server sends to the user or user's notification recipient a written message, such as an e-mail or text, that includes the audio file of the finder's message by means of a hyperlink, attachment, or using transcription.

The lost and found system also allows a finder to submit the phone number and unique code displayed on the tag and report the missing item without having to call the IVR system. In particular, the lost and found system includes a website on which the finder may electronically submit the phone number and unique code of the tag to the web server. The phone number and unique code are combined to form the unique identifier of the tag, which is compared against the database to determine if there is an active matching tag. If the unique identifier of the tag is found in the database, the lost and found system requests the finder to electronically submit the finder's written message indicating the location of the item to the server. Additionally, the lost and found system requests the finder to electronically submit information related to the location of the missing item to the server, including, for example, the name of the location where the missing item can be found, its address, city and state, and pickup instructions to the user to obtain the lost item. The finder's written message is then transmitted from the server directly to the user or the notification recipient by e-mail, text, or other conventional means of written communication.

Preferably, a user obtains tags to affix to the user's portable items by subscribing directly to the lost and found system. Alternatively, the user indirectly obtains tags from the lost and found system by receiving tags from other subscribing entities, including resellers and fundraisers. In particular, users obtain tags from resellers by purchasing portable items of the resellers having tags already attached, and users obtain tags from fundraisers by participating in fundraising efforts and receiving the tags directly from fundraisers. In one embodiment of the present invention, the one or more telephone numbers printed on the tags and associated with the IVR system differ depending on whether the user obtained the tags directly from the lost and found system or indirectly from fundraisers or resellers. In another embodiment, the one or more telephone numbers are different for tags applied to the user's pets, and the IVR system is configurable in the lost and found system to request special instructions from finders to be recorded pertaining to the recovery of a user's missing pet. Regardless of the source of the tags and the differing phone numbers, the lost and found system allows users to locate their missing items by combining a phone number and a unique code into a unique identifier that is stored in the database for identifying the user's particular tag.

In the preferred embodiment of the lost and found system, tags associated with subscribers must be activated before finders can report the location of lost and tagged items. In particular, when a user obtains a sheet of tags, a user is provided a registration code that the user must register with the lost and found system to activate the sheet of tags. Once the user submits the registration code to the lost and found system, the registration code is compared against a database containing registration codes that are associated with the tags. If the registration code is found in the database, the lost and found system activates the tags associated with the registration code, rendering the tags operational. In an alternative embodiment of the lost and found system, the tags are pre-activated in the database before they are provided to the user, and thus the user may use the tags in the lost and found system without having to register the tags.

The lost and found system includes a website on which subscribers, such as users, fundraisers and resellers, may subscribe to the lost and found system and order tags. Subscribers provide subscription data to the lost and found system, including their contact information such as names, addresses, e-mail addresses, and phone numbers, as well as shipping and billing information, preferably by form submission through the website. After the subscription data is provided, the subscription data is stored in the database. Subscribers may thereafter purchase tags and view and manage their account on the website including their subscription data, pending and cancelled tag orders, and associated unique identifiers, phone numbers and e-mail addresses for purchased and registered tags. Generally, the phone numbers and e-mail addresses included in the stored subscription data are automatically linked to and displayed on the website with the subscribers' purchased and registered tags, although subscribers may individually modify the phone numbers and e-mail addresses through the website to include the information of other desired notification recipients. Additionally, subscribers may deactivate or remove their association with purchased and registered tags to render them inoperative in the lost and found system. For example, in problems where the unique identifier of a tag has been compromised by hackers, thereby resulting in an influx of spam notification e-mails or telephone calls by false finders, the user may deactivate the tag to cease the spam. Additionally, a tag may be deactivated in situations where the subscriber fails to maintain their subscription to the lost and found system, for example, by making late subscription payments.

Moreover, subscribers may view a history of previously recorded finders' messages associated with the subscribers' tags, including audio files and written messages, and selectively listen to or view the messages on the website. Subscribers may choose to view these finder message histories in attempt to recover their lost items in situations where, for example, the subscribers misplaced their phone or accidentally lost or destroyed their copy of the finder's message. These finder message histories are stored in the database until they are removed or deleted after a predetermined period of time, or alternatively, in response to the user informing the lost and found system that the lost item has been recovered.

As a result, the present invention allows for a user or owner to recover his or her missing item without having to resort to manually checking every possible location where the item could have been lost or misplaced. Furthermore, the user or owner does not have to physically retrace his or her footsteps by calling or visiting potential locations where the item could be found, and simply has to wait for a finder to locate the item and notify the user or the user's notification recipient of the location of the missing item. Moreover, the lost and found system does not require the user or owner to affix personal information, such as the user's name and phone number, to the item for general members of the public to view, thus safeguarding the user's privacy. In addition, the lost and found system allows the finder to leave a message for the owner using the IVR system without having to physically call the owner, thus safeguarding the finder's privacy from caller ID. Furthermore, the user does not have to encounter low battery alerts, wireless connectivity problems, and misreported item locations that potentially may arise from the use of wireless tracking devices or mobile applications.

Accordingly, a system is provided for facilitating the recovery of a lost item. The system includes one or more tags that each include a unique identifier for identifying an item of a user, a web server including a processor and a memory that is connected to a network, and a database connected to the server storing data including the unique identifier of each tag. Each tag has a label which displays a phone number and a unique code that together comprise the tag's unique identifier. The server is in communication with an IVR system through an IVR API over the network.

The system further includes computer-readable instructions stored in the memory that when executed on the processor, cause the processor to facilitate the recovery of a lost item by performing one or more steps. Specifically, the steps executed on the processor include receiving the phone number and unique code of the one or more tags from a finder of the item in communication with the IVR system through the IVR API, storing the phone number and unique code as a combined unique identifier in the memory of the server, comparing the unique identifier with the data stored in the database to verify if a matching unique identifier exists and generating a response including a phone number associated with the matching unique identifier, and transmitting the response to the IVR system through the IVR API to obtain an audio message from the finder indicating the location of the item, to call the phone number associated with the matching unique identifier, and to play the audio message. The phone number associated with the matching unique identifier may be the phone number associated with the user or the user's notification recipient.

Alternatively, the processor receives the phone number and unique code of the one or more tags from the finder of the item into memory through a website on the server, compares the unique identifier including the phone number and unique code with the data stored in the database to verify if a matching unique identifier exists, receives a written message from the finder including information indicating the location of the item on the website, and transmits the written message to the user or user's notification recipient associated with the matching unique identifier. Such information included in the written message may include the name and address of the location as well as pickup instructions for the found item. Additionally, the website may display a history of previously recorded audio messages and written messages from finders associated with the one or more tags for the user to hear and view, respectively. These audio messages and written messages may be removed after a predetermined period of time.

Furthermore, the processor additionally receives the audio message indicating the location of the item from the IVR system through the IVR API, stores the audio message from the finder into the memory of the server and a file location path to the stored audio message in the database, creates a written message that includes a hyperlink to the file location path of the audio message, an attachment to the written message that includes the stored audio message, or optionally a transcription of the audio message, and sends the written message with the included audio message indicating the location of the item to the user. Where a hyperlink is used, the processor sends the written message with the hyperlink to the user, and the audio message is played on the website when the user activates the hyperlink.

In one embodiment, the server in the lost and found system is hosted in a virtual private cloud. The virtual private cloud includes one or more virtual servers, a public network, and a private network. The public network is in communication with an Internet network and the one or more virtual servers, and the private network is in communication with the public network. One or more network interfaces control network traffic to and from the one or more virtual servers within the public network and the private network. Preferably, the one or more virtual servers include the web server and database used for the web application.

A method is also provided for facilitating the recovery of a lost item. The method includes providing one or more tags to a user each having a label which displays a phone number and a unique code that together comprise the tag's unique identifier for the user to apply to an item, receiving the phone number and unique code of the one or more tags from a finder of the item in communication with the IVR system through the IVR API, storing the phone number and unique code as a combined unique identifier in the memory of the server, comparing the unique identifier with the data stored in the database to verify if a matching unique identifier exists and generating a response including a phone number associated with the matching unique identifier, and transmitting the response to the IVR system through the IVR API to obtain an audio message from the finder indicating the location of the item, to call the phone number associated with the matching unique identifier, and to play the audio message. The phone number associated with the matching unique identifier may be the phone number associated with the user or the user's notification recipient.

Alternatively, the method may include receiving the phone number and unique code of the one or more tags from the finder of the item into memory through a website on the server, comparing the unique identifier including the phone number and unique code with the data stored in the database to verify if a matching unique identifier exists, receiving a written message from the finder including information indicating the location of the item on the website, and transmitting the written message to the user or user's notification recipient associated with the matching unique identifier. Furthermore, the method may include additionally receiving the audio message indicating the location of the item from the IVR system through the IVR API, storing the audio message from the finder into the memory of the server and a file location path to the stored audio message in the database, creating a written message that includes a hyperlink to the file location path of the audio message, an attachment to the written message that includes the stored audio message, or optionally a transcription of the audio message, and sending the written message with the included audio message indicating the location of the item to the user. Where a hyperlink is used, the written message is sent with the hyperlink to the user, and the audio message is played on the website when the user activates the hyperlink.

The method further includes obtaining subscription data from an entity, storing the subscription data in the database, and associating the tag in the database with the subscription data. The entity from which subscription data is obtained may include a user, a fundraiser with whom the user is participating, and a reseller of the item to be obtained by the user. Moreover, the method further includes receiving the phone number for each tag from a provider of the interactive voice response system and generating the unique code for each tag at the server. Additionally, the method includes generating a registration code for activating the one or more tags, providing the registration code to the user, and activating the one or more tags in response to receiving the registration code from the user.

These and other features and advantages of the present invention will become apparent from the following detailed description of preferred embodiments which, taken in conjunction with the accompanying drawings, illustrate by way of example the principles of the invention.

BRIEF DESCRIPTION OF THE DRAWINGS

FIG. 3 is an exemplary diagram of a sheet of tags that can be applied to lost items, where each tag includes a phone number and a unique code for identifying the tags.

DETAILED DESCRIPTION OF THE PREFERRED EMBODIMENTS

Figure 1:
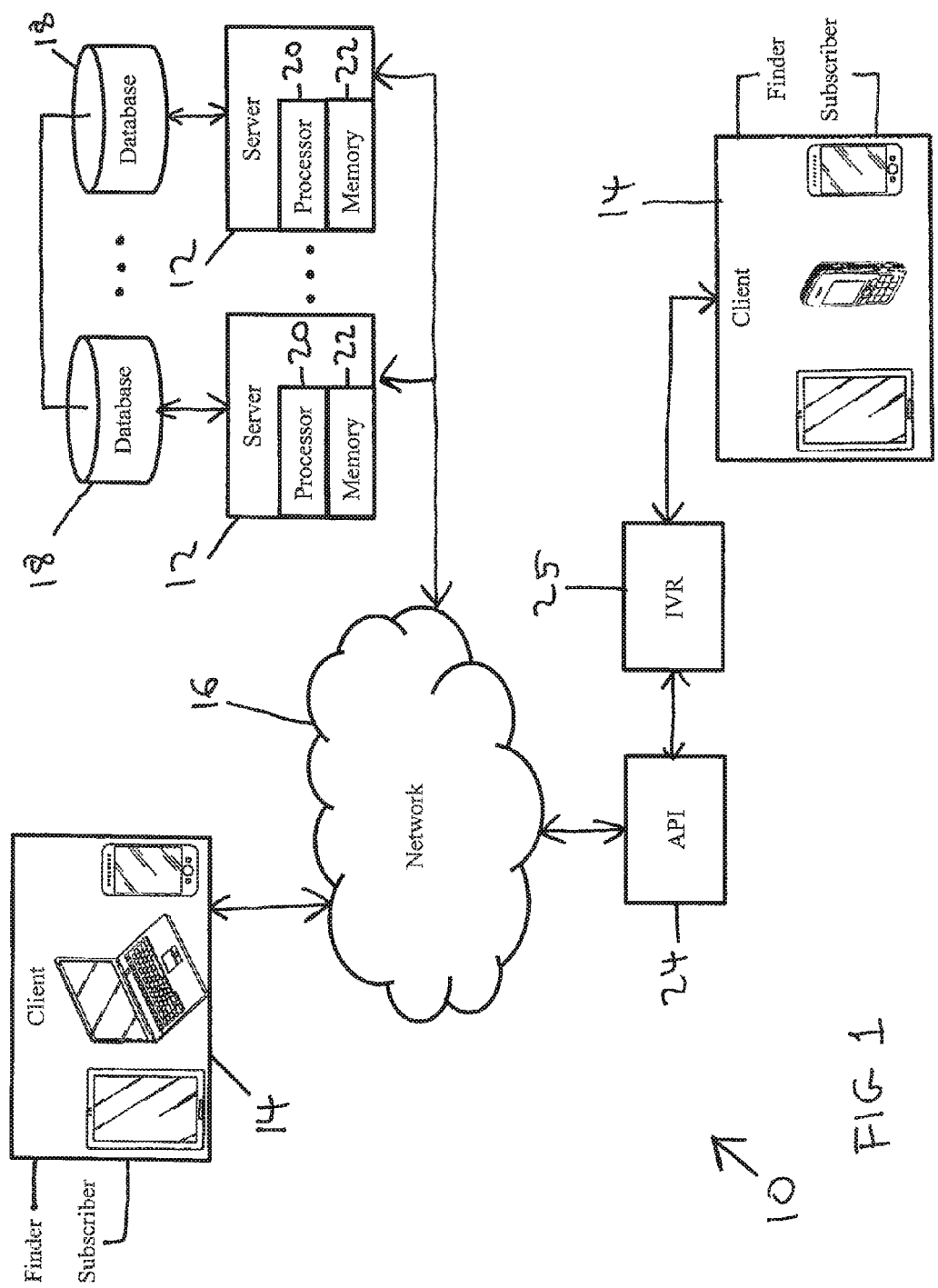
FIG. 1 is a schematic diagram of computer architecture of a system for facilitating the recovery of lost items according to a preferred embodiment of the present invention.

Referring to FIG. 1, a system 10 for facilitating the recovery of lost items is provided that includes one or more servers 12 in communication with one or more clients 14 over a network 16. Servers 12 are connected to one or more databases 18. Clients 14 include any device connected to the network, including, but not limited to, desktop computers and mobile devices such as laptops, tablets, and smartphones, and are operated by subscribers and finders. Network 16 may be a local area network (LAN), a metropolitan area network (MAN), a wide area network (WAN), or an interconnection of multiple computer networks (e.g., the Internet). Clients 14 may be directly or indirectly connected to network 16 by Wi-Fi, by a physical tangible link, by telephony, using VoIP, or by other conventional means of communication. For example, FIG. 1 illustrates one client (top) such as a laptop, smartphone, or tablet connected using Wi-Fi to network 16, and another client (bottom) such as a tablet, smartphone, or other cellphone connected by telephone to an IVR system 25, discussed below, which, in turn, communicates data through IVR API 24 over network 16.

The servers 12 each include a processor 20 and a memory 22. Processor 20 includes hardware for executing computer-executable instructions, such as those produced by software programs. Herein, reference to software may encompass one or more applications, byte code, one or more computer programs, one or more executables, one or more instructions, logic, machine code, one or more scripts, or source code, and vice versa, where appropriate. Memory 22 may be random access memory (RAM), including static random access memory (SRAM) and dynamic random access memory (DRAM), read-only memory (ROM), or a persistent store, such as a mass storage device, hard drives, CD-ROM, DVD-ROM, tape, erasable programmable read-only memory (EPROM or flash memory), or any magnetic, electromagnetic, infrared, optical, or electrical system, apparatus or device for storing information. A software module including computer-readable instructions for execution by processor 20 may reside in memory 22. In an exemplary embodiment, processor 20 performs computer-executable instructions that read and process data used to facilitate the recovery of lost items, and memory 22 stores the data read and processed.

The server 12 is in communication with an interactive voice response (IVR) system 25 over the network 16. The IVR system 25 is preferably managed by a third party, for example, DialogTech™. Alternatively, the IVR system 25 may be managed within system 10. The server 12 communicates with the IVR system 25 through an IVR application programming interface (API) 24. The IVR system 25 is configured to receive and respond to calls from a finder regarding the location of a user's lost item, and to report the finder's message indicating the location of the lost item to the user. More specifically, the IVR system 25 is configured to receive a call from a finder, to transmit data from the finder to the system 10 through the IVR API 24, to respond to the finder using data transmitted from databases 18 of the system 10 through the IVR API, to receive a message from the finder regarding the location of the user's lost item, and to call the user and report the finder's message, all in real-time. The server 12 also reports the finder's message indicating the location of the lost item to the user in written form.

Figure 2:
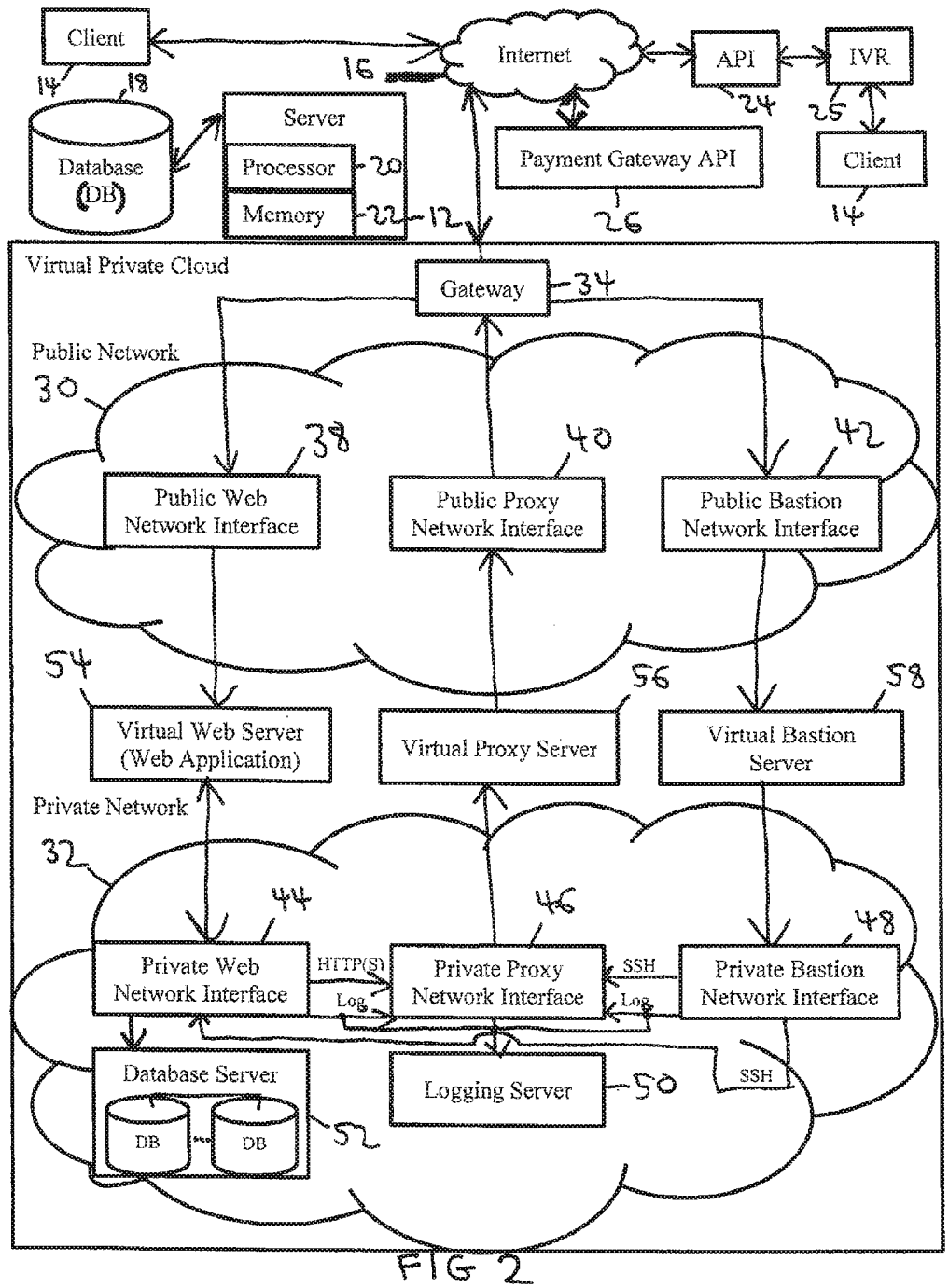
FIG. 2 is a schematic diagram of computer architecture of a system for facilitating the recovery of lost items where the system is hosted on a virtual private cloud according to an alternate embodiment of the present invention.

FIG. 2 illustrates an embodiment of a computer architecture of system 10 for facilitating the recovery of lost items. The system 10 includes the server 12 with processor 20 and memory 22 that is connected to the one or more databases 18. Clients 14, which are operated by users, fundraisers, or resellers, for example, are connected to the server 12 over Internet network 16.

The server 12 is in communication with an interactive voice response (IVR) system 25 over the network 16 through an IVR application programming interface (API) 24, as discussed above. Additionally, the server 12 is in communication with a payment gateway API 26 over the network 16. Payment gateway API 26 is configured to authorize payment transactions and capture payment funds, for example, using a payment gateway service provider such as Authorize.Net®. For example, payment gateway API 26 is used to process payment transactions when a client subscribes to system 10.

In the embodiment depicted in FIG. 2, the system includes a virtual private cloud 28 in which the server 12 and the one or more databases 18 are located. The virtual private cloud 28 is preferably hosted by a PCI DSS compliant cloud hosting provider. Conventional cloud providers may include, for example, Amazon Web Services® (AWS®).

The virtual private cloud 28 preferably includes a public network 30 and a private network 32, although only public network 30 may exist in some embodiments. Public network 30 is in communication with network 16 through an Internet gateway 34 and is configured to receive unsecured and secured hypertext transfer protocol (HTTP/HTTPS) web requests and secure shell (SSH) communications from the network 16. Private network 32 is in communication with the public network 30 and is configured to receive only SSH communications from the public network 30.

Public network 30 includes one or more network interfaces, for example, AWS® Elastic Network Interfaces, that control network traffic throughout the virtual private cloud 28. For example, public network 30 may include a public web network interface 38, a public proxy network interface 40, and a public bastion network interface 42. These network interfaces control traffic to or from one or more virtual servers. For example, public web network interface 38 interfaces with virtual web server 54, public proxy network interface 40 interfaces with virtual proxy server 56, and public bastion network interface 42 interfaces with virtual bastion server 58.

In one example, the virtual servers in communication with public network 30 are separate Amazon Elastic Compute Cloud (Amazon EC2®) instances that use a Linux® operating system, and the network interfaces are attached to the instances as network interface cards. Virtual web server 54 is configured to run the web application for system 10 and serves HTTP/HTTPS web requests for clients 14. Virtual proxy server 56 is configured to control outbound web traffic from public web server 38 that is not in response to a client's request and to allow HTTP/HTTPS access to only specific domains. For instance, virtual proxy server 56 may communicate with payment gateway API 26 during the processing of credit card transactions for client subscription processes. Virtual bastion server 58 is configured to provide a point of entry into private network 32 and to run an SSH daemon that allows only SSH communications to enter the private network 32. All servers have stateful firewalls in place.

Similarly, private network 32 includes one or more network interfaces. For instance, private network 32 may include a private web network interface 44, a private proxy network interface 46, and a private bastion network interface 48 that operate in similar fashion to their respective public counterparts (i.e. network interfaces 38, 40, and 42). Additionally, private network 32 may include a virtual logging server 50 to which the network interfaces direct daemon and operating system logs. Moreover, private web network interface 44 controls traffic to a dedicated, virtual database server 52 that is preferably managed by a relational database management system such as MySQL.

Although FIG. 2 depicts server 12 and database 18 outside the virtual private cloud 28, the server 12 and the one or more databases 18 may be located anywhere in the virtual private cloud 28. For example, server 12 may be located in the virtual private cloud 28 as virtual web server 54, or in either network as an additional server. Additionally, database 18 may be located in private network 32 on virtual database server 52, or in either network as an additional database.

Referring now to FIG. 3, the system 10 includes a sheet 100 that contains a plurality of tags 102. Tags 102 may be of various shapes and sizes and are configured to be attached or adhered to items of a user. For example, tags 102 may be placed on any portable object of a user, including, but not limited to, electronic devices such as laptops, tablets, mobile phones, credit cards, USB hard drives, and cameras, as well as suitcases, wallets, purses, bicycles, keys, keychains, passports, drivers' licenses, luggage, sports equipment, games, backpacks, apparel, musical instruments, and other items.

Each tag 102 has a label 104 that displays a phone number 106 and a unique code 108 identifying the tag. Phone number 106 is associated with the IVR system 25 for finders of lost items having tags 102 to call to report a missing item. For example, phone number 106 may be a ten-digit phone number with a toll free area code that finders may call to access IVR system 25. Unique code 108 is a numeric or alphanumeric code that contains a predetermined number of digits or characters for identifying the individual tag 102. For example, unique code 108 may be an arbitrarily or randomly selected arrangement of characters that is electronically generated by processor 20 on the server 12 to uniquely identify tag 102. Phone number 106 and unique code 108 are combined into a unique identifier 110 for each tag 102, which is stored in database 18. Thus, if unique code 108 contains seven characters as illustrated in FIG. 3, unique identifier 110 has a length of seventeen characters.

Although unique code 108 is different for each tag 102 to uniquely identify each tag, phone number 106 may be identical or different for each sheet 100 or tag 102. For example, in the preferred embodiment of the present invention, the user may acquire sheet 100 or tag 102 from a fundraiser with whom the user is participating, such as a school district, or a reseller of an item that the user has purchased or obtained. In such cases, the phone number 106 may differ for each sheet 100 or tag 102 to enable system 10 to track frequency of calls of different sources for marketing or other purposes.

When a user obtains a sheet 100 of tags 102, the tags are preferably disabled for use unless they are registered with system 10. Each sheet 100 of tags 102 thus includes a registration code 112 which has been stored in database 18 by processor 20 of server 12 and associated with the unique identifiers of tags 102. Registration code 112 is an identifier for sheet 100 that the user provides to system 10 to activate tags 102 for use. For example, registration code 112 may be an alphanumeric code that is randomly generated by processor 20 on server 12. The user registers and activates tags 102 on sheet 100 all at once by submitting registration code 112 to server 12, for example, through a website for system 10 or by telephone through the IVR system. When processor 20 of server 12 receives registration code 112, either through the website of system 10 or alternatively from IVR system 25, processor 20 verifies registration code 112 against database 18. If the received registration code matches registration code 112 stored in database 18, then processor 20 updates database 18 to render all tags 102 on sheet 100 active, thus enabling the user to use the tags and enabling finders to report lost items. Alternatively, the tags 102 are pre-activated in the database for use by a user in situations where the user does not have a registration code 112, such as when the user obtains a previously tagged item from a reseller.

In the preferred embodiment of the present invention, a user subscribes to system 10 and receives a sheet 100 of tags 102 whose unique identifiers 110 have been stored in database 18 by processor 20 in server 12. The tags 102 may be pre-activated for use in database 18; alternatively, the user may subsequently register the sheet 100 with system 10 to activate the tags. If the user thereafter loses or misplaces his or her item, for example, in a public place, a finder who discovers a user's lost item having tag 102 calls phone number 106 to report the missing item to the IVR system 25. When the IVR system prompts the finder to identify the lost item, the finder submits unique code 108 displayed on tag 102 to the IVR system, which is transferred to the server 12 through IVR API 24. Processor 20 in server 12 subsequently receives the unique identifier 110, including phone number 106 and unique code 108, from IVR system 25, and verifies the unique identifier received against database 18.

If the unique identifier received matches the unique identifier 110 stored in database 18, processor 20 generates a response including the user's provided phone number and transmits the response to the IVR system through IVR API 24. Alternatively, if the user has designated another person to be the user's notification recipient to receive messages on behalf of the user, the response generated by processor 20 includes the notification recipient's provided phone number in lieu of the user's phone number. After receiving the response, the IVR system prompts the finder to leave an audio message indicating the location of the lost item, after which the IVR system sends the message indicating the location of the lost item to the user by automatically calling the phone number of the user or the user's notification recipient. In addition, processor 20 receives the audio message from the finder through IVR API 24, stores the audio message in memory 22 and its file location path in database 18, and sends a written message to the user or user's notification recipient in real-time, for example, by e-mail or text, including a hyperlink to or an attachment with the audio message.

Alternatively, the lost and found system allows the finder to report the location of the user's missing item without calling IVR system 25, for example, in situations where the finder has a computer or tablet. In such a situation, a finder who discovers a user's lost item having tag 102 electronically submits the phone number 106 and the unique code 108 to server 12, for example, by using a website form. Processor 20 receives the phone number 106 and the unique code 108, combines them into unique identifier 110, and compares the unique identifier 110 against the database 18. If the unique identifier received matches that stored in database 18, the finder is requested to provide a written message indicating the location of the user's missing item. After the finder electronically submits the written message to server 12, for example, using a website form, processor 20 receives the written message and sends it in real-time to the user or the user's notification recipient.

Figure 4:
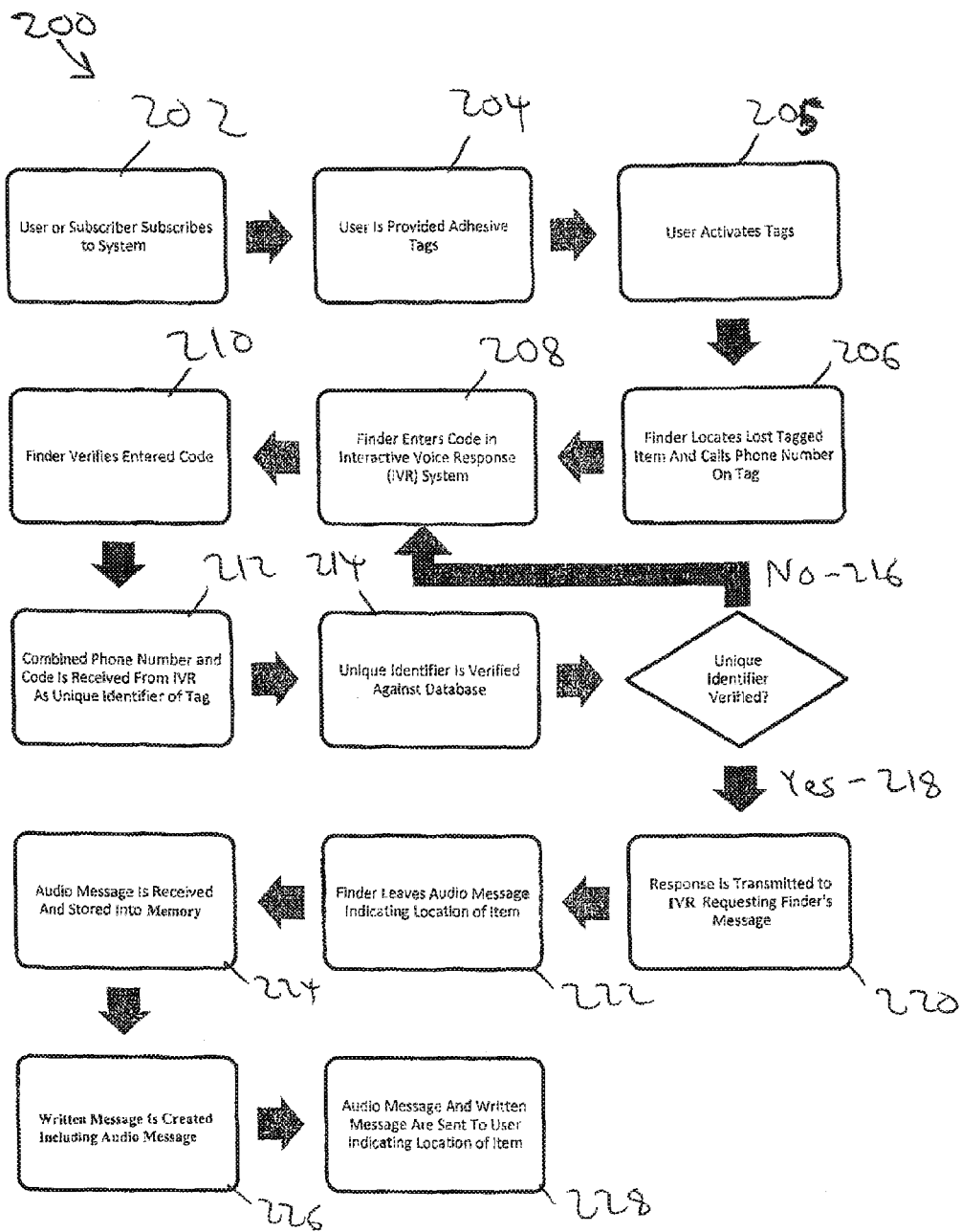
FIG. 4 is a schematic diagram of a method for facilitating the recovery of lost items.

FIG. 4 depicts a method 200 of facilitating the recovery of lost items in the preferred embodiment of the present invention. First, the user or other subscriber, for example, a fundraiser or reseller, subscribes to system 10 (202). During this process, data is stored in database 18 connected to server 12. Such data may include the user's contact information, contact information of the user's notification recipient who will receive reports on behalf of the user, user shipping and billing information, fundraiser shipping and billing information, fundraiser goals, number of participants in the fundraiser, reseller shipping and billing information, and items tagged. More details with respect to the subscription process are described below with respect to FIGS. 6-8.

After the subscription process is complete, the user is provided one or more sheets 100 of tags 102 for the user to apply or adhere to an item (204). Items may include any portable object such as a computer, a mobile phone, a tablet, a credit card, a suitcase, a wallet, a purse, a bicycle, a USB hard drive, a camera, keys, a passport, a driver's license, sports equipment, luggage, a game, eyewear, a backpack, apparel, keychains, musical instruments, or any other item. The user is preferably provided tags 102 directly. Alternatively, fundraisers with whom the user is participating, or resellers of items that the user has purchased or obtained, are provided tags 102 that are in turn given to the user, for example, as part of a fundraising effort to raise money or after the user has purchased a tagged item.

Each tag 102 includes a unique identifier 110 comprising a phone number 106 for a finder to call and report a missing item and a unique code 108 that is unique for each tag 102 for identifying the item. Phone number 106 may be identical or different for each tag 102 in sheet 100, and unique code 108 is always different for each tag 102. Before the tags are provided to the user, the unique identifier 110 of each tag 102 is stored in database 18 and associated with the user's or other subscriber's data. For example, the unique identifier 110 of each tag 102 is linked in database 18 to the user's, fundraiser's, or reseller's contact information.

In one embodiment, after a user subscribes to system 10 and is directly provided tags 102, or alternatively, after a user is indirectly provided tags 102 using a fundraiser and then subscribes to system 10, the user may immediately begin applying tags 102 on the user's items for a finder to locate and report (steps 206 and onward), without the user being required to undertake an activation process for using the tags. However, in the preferred embodiment of the present invention, the user is provided inoperative tags and is required to activate them before use (205).

Figure 5:
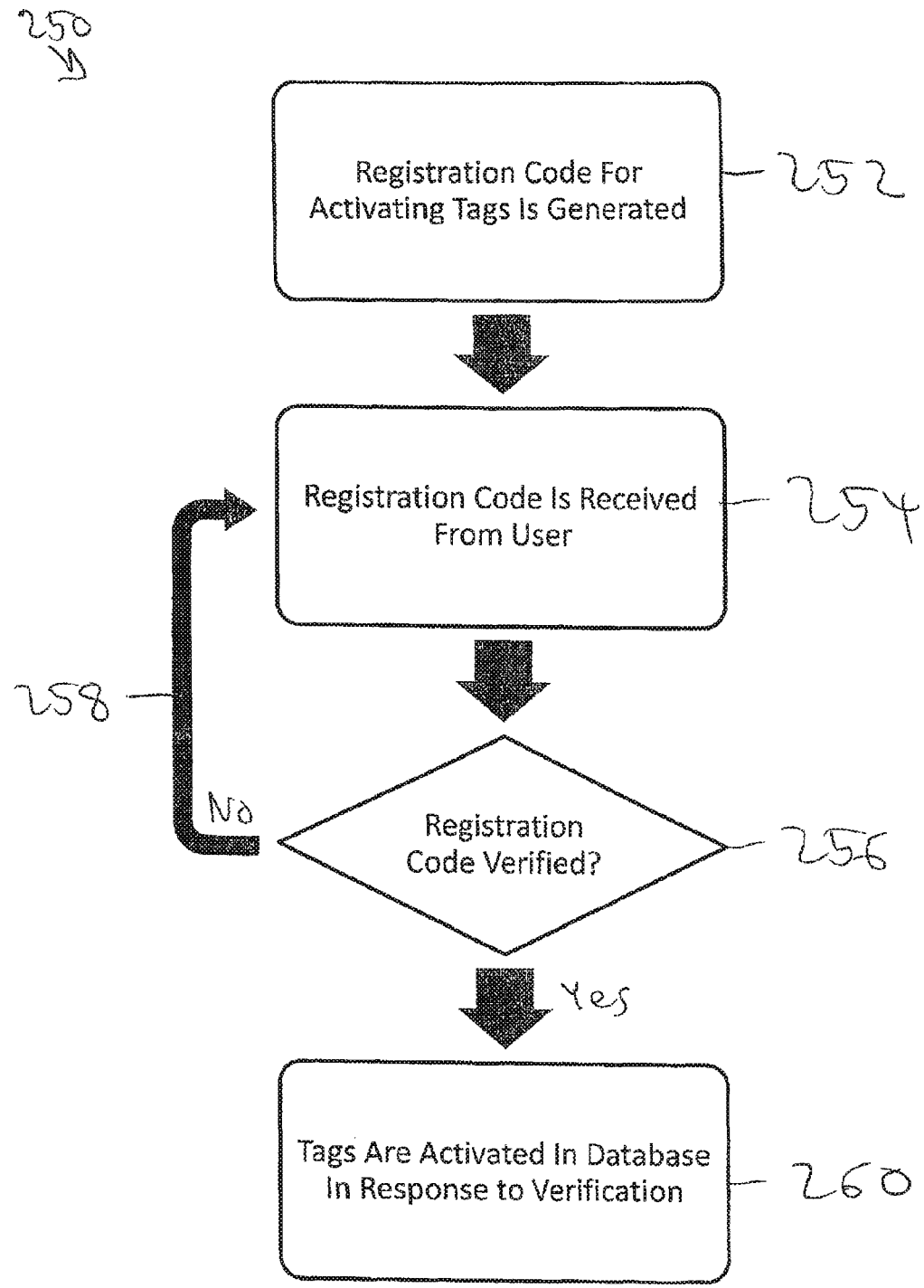
FIG. 5 is a schematic diagram of an optional process for activating tags with a registration code prior to use.

FIG. 5 illustrates a method 250 of activating tags for use in system 10 in accordance with step 205 of FIG. 4. First, before the tags are provided to the user, an alphanumeric registration code 112 for activating a sheet 100 of tags 102 is generated (252). For example, registration code 112 may be an arbitrarily or randomly selected arrangement of characters that is electronically generated by processor 20 on the server 12. After registration code 112 is generated and before the user obtains the tags, the registration code is stored in database 18 and associated with the stored unique identifiers 110 of tags 102.

Once the user receives the inoperative tags 102 with registration code 112, the user activates the tags by submitting registration code 112 to system 10, for example, using a website submission form. When system 10 receives the user-submitted registration code 112 (254), the system verifies the received registration code by comparing it with the associated registration code in database 18 (256). If the received registration code does not match the associated registration code 112, then the user is informed of an error, the tags remain inoperative, and the user must re-submit the correct registration code to activate the tags (258). If the received registration code matches associated registration code 112, then the sheet 100 of tags 102 is activated in database 18 (260). As a result, the tags become operative and the user is free to apply the tags to the user's items.

Referring back to FIG. 4, after the tags are activated, the user applies tag 102 to a portable item. If the user subsequently was to lose or misplace the item, for example in a public place, and a finder locates the lost tagged item, then the finder calls the phone number 106 displayed on tag 102 (206). In one example, phone number 106 is a toll-free number generated by the IVR system. After the finder calls the phone number 106, the IVR system prompts the finder to submit the unique code 108 of tag 102. When the finder submits the unique code 108 (208), the IVR system 25 is configured by processor 20 to read back the submitted unique code to the finder and ask the finder to verify that the unique code is correct (210). For example, the IVR system may prompt the finder to select or say '1' or 'Yes' if the unique code was entered correctly, or '2' or 'No' if the unique code was entered incorrectly. If the finder were to respond that the unique code 108 was entered incorrectly, then the finder is prompted to re-enter the code, or alternatively instructed to call the phone number again, and repeat the self-verification process.

If the finder responds to the IVR system 25 that the unique code 108 was entered correctly, then the processor 20 receives the phone number 106 and submitted unique code 108 as a combined unique identifier 110 from IVR system 25 through IVR API 24 (212). The processor 20 then verifies the received unique identifier by comparing it with the data stored in database 18 (214). If the received unique identifier does not match any unique identifier 110 stored in the database for an active or operative tag (216), then the processor 20 transmits a negative response back to the IVR system 25 using IVR API 24 that the unique code was not found. As a result, the finder is prompted to repeat steps 208 and onward. On the other hand, if the received unique identifier matches a unique identifier 110 stored in database 18 for an active or operative tag (218), then the processor 20 generates and transmits a positive response including the user's phone number, or alternatively, the phone number of the user's notification recipient, back to the IVR system 25 through IVR API 24 to prompt the finder to leave an audio message indicating the location of the item (220) and then automatically send the audio message to the user or notification recipient.

After the finder leaves the audio message indicating the location of the item (222), the processor 20 receives the finder's audio message from the IVR system 25 through IVR API 24 in the form of a .WAV file, for example, and stores the audio message in memory 22 and its file location path in database 18 (224). Processor 20 subsequently creates a written message indicating the location of the item (226), for example, by including a hyperlink to the stored audio message or by attaching the stored audio message to the written message. Alternatively, processor 20 may convert the audio message to a written message by transcription at the server 12, or in an embodiment where the IVR system has transcription capabilities, processor 20 may receive the written message from the IVR system using IVR API 24. Once the written message is created, processor 20 sends the written message to the user or user's notification recipient (228) preferably at the same time as the audio message indicating the location of the item. In this way, system 10 notifies user 14 or the user's notification recipient of the finder's message indicating the location of the item by phone, text, e-mail, or any other conventional method of communication in real-time.

Figure 6:
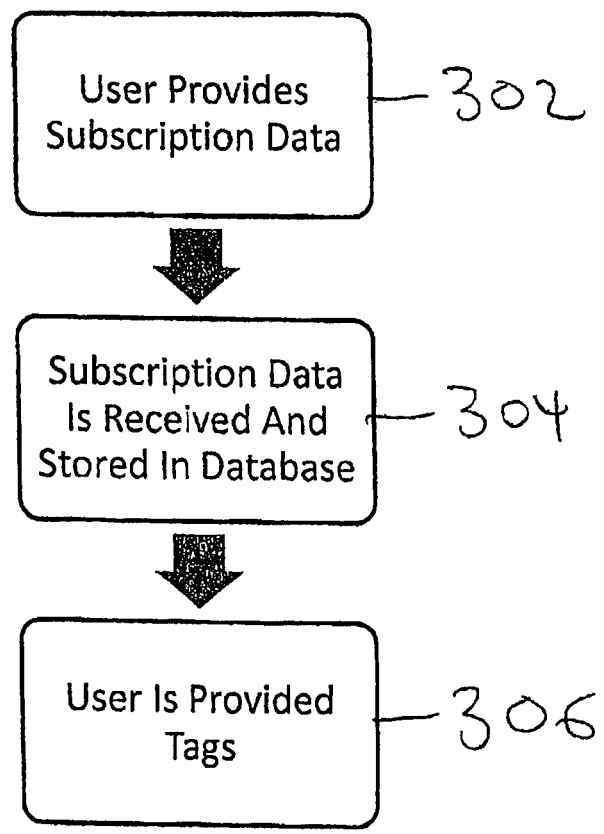
FIG. 6 is a schematic diagram of an exemplary user subscription process in which the user receives tags to apply to items after providing subscription data to the system.

FIG. 6 illustrates a method 300 where a user subscribes to system 10 before being provided tags 102. Specifically, a user subscribes to system 10 by providing subscription data to system 10 (302). Subscription data may include the user's contact information such as the user's name, address, e-mail address, and phone number, as well as the user's shipping and billing information. The user may provide subscription data to system 10, for example, through a form submission on a website associated with system 10.

After system 10 receives the user's subscription data, the subscription data is stored in database 18 (304), the user is optionally given an e-mail confirmation from system 10, and the subscription process is complete. From here, the user may log in to system 10 through the website, the user may order or purchase one or more sheets 100 of tags 102, and the user may view and manage the user's account including the user's subscription data, pending and cancelled orders of tags, and the unique identifiers 110 of tags purchased that are associated with the user's account. If the user selects to purchase one or more sheets 100 of tags 102, the tags 102 are associated with the user's subscription data in database 18 and are shipped or provided to the user (306). As a result, the user may check the system's website to verify the accuracy of unique identifiers 110 for purchased tags and may freely apply tags 102 to any of the user's items.

Figure 7:
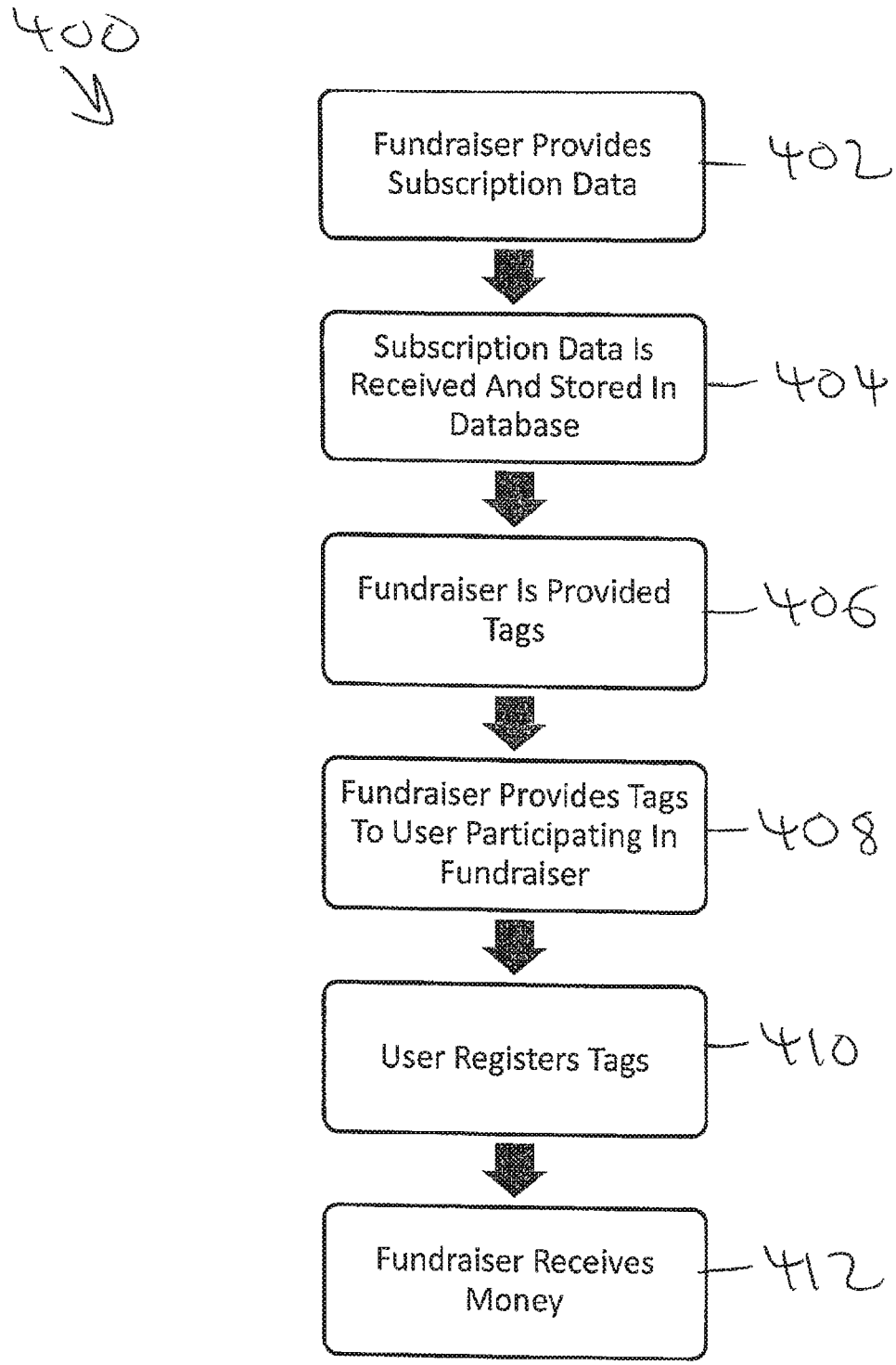
FIG. 7 is a schematic diagram of an exemplary fundraiser subscription process in which the user receives tags to apply to items from a fundraiser with whom the user is participating.
Figure 8:
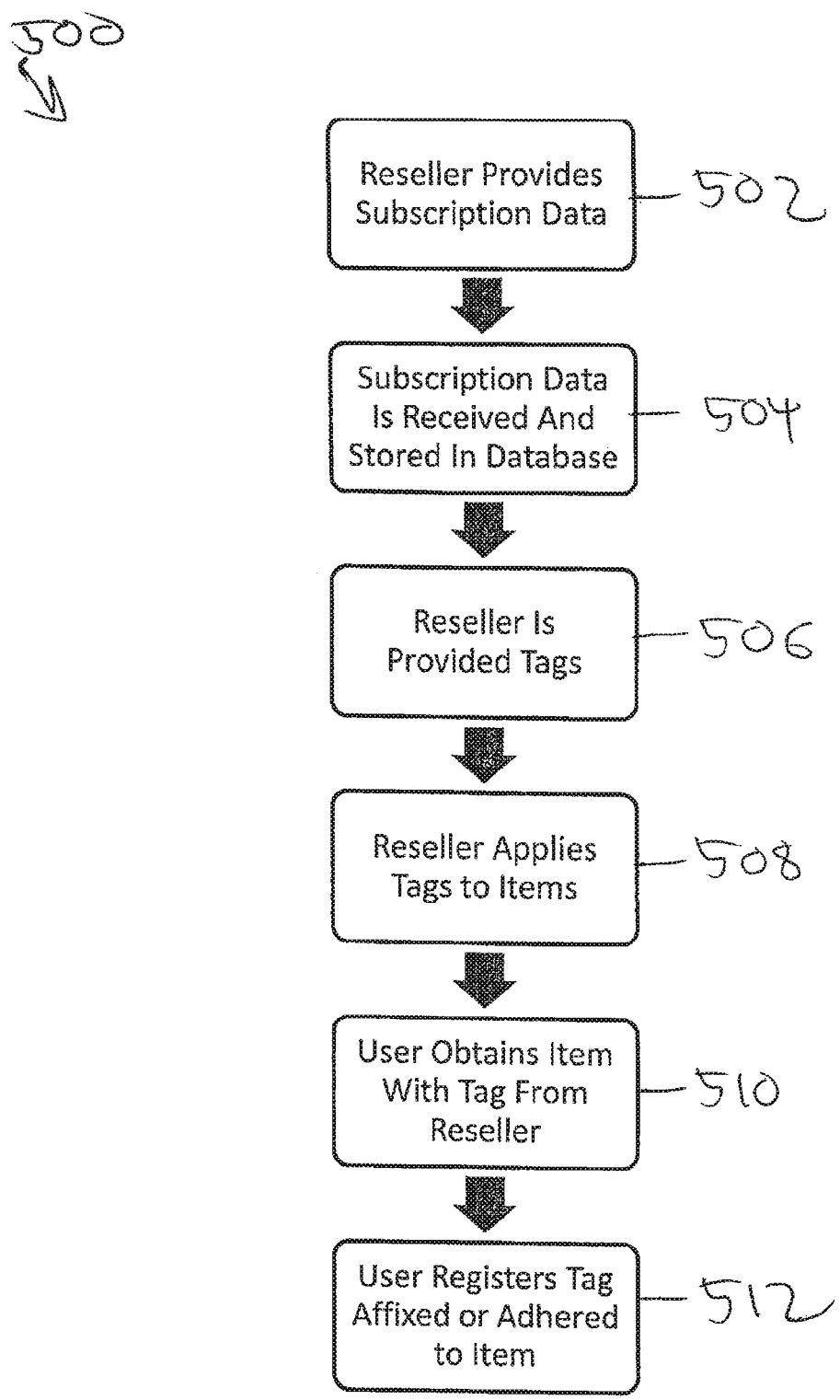
FIG. 8 is a schematic diagram of an exemplary reseller subscription process in which the user receives tags to apply to items from a reseller from whom the user purchased the tagged items.

In the preferred embodiment of the present invention, entities other than users may subscribe to system 10, including fundraisers and resellers. FIG. 7 illustrates an exemplary method 400 of a subscription process for fundraisers. Similarly, FIG. 8 illustrates an exemplary method 500 of a subscription process for resellers. After the fundraiser or reseller subscribes to system 10 and is consequently provided tags 102, the fundraiser or reseller provides the tags to the user to apply to items as previously described.

Referring to the exemplary method 400 depicted in FIG. 7, a fundraiser first subscribes to system 10 by providing subscription data to system 10 (402). Subscription data may include the fundraiser's contact information such as the fundraiser's name, address, e-mail address, phone number, the organization for which the fundraiser is raising money, the fundraiser's goal amount, the number of fundraiser participants, the number of sheets 100 or tags 102 requested to be ordered, as well as the fundraiser's shipping and billing information. The fundraiser may provide subscription data to system 10, for example, through a form submission on a website associated with system 10.

Alternatively, the fundraiser's subscription may be based on an application process. In a preferred embodiment of step 402, the fundraiser first applies for a subscription by providing initial subscription data to system 10 including the fundraiser's name, address, e-mail address, phone number, the organization for which the fundraiser is raising funds, the fundraiser's goal amount, and the number of sheets 100 or tags 102 requested to be ordered. After the fundraiser provides the initial subscription data to system 10, for example, through a website form submission, an administrator of system 10 verifies the fundraiser's initial subscription data by at least determining if the fundraiser is a school district or other fundraising entity and confirming the existence of the organization for which the fundraiser is raising funds. If the administrator approves the fundraiser's application, the system 10 directs the fundraiser to a supplemental registration form, for example, by an e-mailed hyperlink, to provide supplemental subscription data to system 10. Supplemental subscription data may include initial subscription data as well as the fundraiser's shipping information and billing information including automated recurring billing ("ARB") data. The initial subscription data and the supplemental subscription data together form the fundraiser's complete subscription data.

After system 10 receives the fundraiser's subscription data, the subscription data is stored in database 18 (404), the fundraiser is optionally given an e-mail confirmation from system 10, and the subscription process is complete. Additionally, the tags 102 the fundraiser ordered are associated with the fundraiser's subscription data in database 18 and shipped or provided to the fundraiser (406). From here, the fundraiser may log in to system 10 through the website, and the fundraiser may view and manage the fundraiser's account including the fundraiser's subscription data, tag orders, and the tag unique identifiers 110 of purchased tags associated with the fundraiser's account. Optionally, the fundraiser may order or purchase additional tags 102 with administrator approval.

Preferably, the fundraiser may log in to system 10 through the website to track the registration status of tags 102 that the fundraiser has purchased and provided to various users. The registration status of the tags may be displayed as either registered or active, or as unregistered or inactive. Preferably, at the time when the tags are provided to the fundraiser, the registration status of each tag is displayed by default as unregistered until a user has registered or activated a tag with system 10. Alternatively, the tags may be pre-associated with the fundraiser in database 18 as registered or active tags without requiring the tags to be separately registered or activated by users.

After the fundraiser receives the one or more sheets 100 of tags 102, the fundraiser provides a sheet 100 of tags 102 to a user who is participating with the fundraiser (408). For instance, the fundraiser may provide the tags 102 to a user physically, such as by shipping the sheet 100 to the user. Moreover, the system 10 provides a hyperlink for the fundraiser to send to the user, which the user may then activate to subscribe to system 10 and order tags associated with the fundraiser. After activating the hyperlink, the user subscribes to system 10 using the subscription process referenced with respect to FIG. 6. More specifically, the user provides subscription data including the user's name, address, e-mail address, phone number, and billing information to system 10, for example, using a website of system 10. Moreover, the user may also simultaneously register the tags to render them operative (410). For example, the user may submit registration code 112 to system 10 to register the tags with system 10. In this way, the system 10 allows the fundraiser to track the registration status of the user's tags.

After system 10 receives the user's subscription data, the user's subscription data is stored in database 18 and user subscription is complete. From here, the user may perform the same functions as described above with reference to FIG. 6, including logging in to system 10 through the website, ordering or purchasing additional sheets 100 of tags 102, and viewing and managing the user's account including the user's subscription data, pending and cancelled orders of tags, and the unique identifiers 110 of purchased tags associated with the user's account.

In one embodiment, the fundraiser may receive a payment in support of the fundraiser's efforts in response to every tag 102 that a user has registered (412). In an exemplary embodiment, the system 10 may award the fundraiser a predetermined monetary amount for every tag 102 that the fundraiser provided to users and that was registered within a fundraiser expiration period beginning from the date the fundraiser completed its subscription process, culminating in a prepaid card or check that is made out to the fundraiser when the fundraiser's goal is reached. Moreover, if a user were to attempt to order or register tags after the fundraiser expiration period, such purchases or registrations would be omitted when calculating the reward to the fundraiser. For example, given a fundraiser expiration period of one year, if the fundraiser subscribes on January 1 with a fundraising goal of $100 and provides tags 102 to twenty participants, and all twenty participants register their tags with system 10 no later than December 31 by activating the fundraiser's hyperlink referenced above, then assuming the predetermined monetary amount is five dollars for each tag registered, the fundraiser will be rewarded with a prepaid card or check for $100. Any user orders or registrations made after the December 31 fundraiser expiration period would not be rewarded to the fundraiser.

Referring now to FIG. 8, the subscription process for a reseller is similar to that of a fundraiser. In exemplary method 500, a reseller first subscribes to system 10 by providing subscription data to system 10 (502). Subscription data may include the reseller's contact information such as the reseller's name, address, e-mail address, phone number, the reseller's company, the reseller's product to be tagged, and the sale price of the product, the number of sheets 100 or tags 102 requested to be ordered, as well as the reseller's shipping and billing information. The reseller may provide subscription data to system 10, for example, through a form submission on a website associated with system 10.

Alternatively, the reseller's subscription may be based on an application process. In a preferred embodiment of step 502, the reseller first applies for a subscription by providing initial subscription data to system 10 including the reseller's name, address, e-mail address, phone number, the reseller's company, and the number of sheets 100 of tags 102 requested to be ordered. After the reseller provides the initial subscription data to system 10, for example, through a website form submission, an administrator of system 10 verifies the reseller's initial subscription data by at least determining if the reseller is a company that sells portable items that can be tagged. If the administrator approves the reseller's application, the system 10 directs the reseller to a supplemental registration form, for example, by an e-mailed hyperlink, to provide supplemental subscription data to system 10. Supplemental subscription data may include initial subscription data as well as the reseller's shipping information and billing information including automated recurring billing ("ARB") data. The initial subscription data and the supplemental subscription data together form the reseller's complete subscription data.

After system 10 receives the reseller's subscription data, the subscription data is stored in database 18 (504), the reseller is optionally given an e-mail confirmation from system 10, and the subscription process is complete. Additionally, the tags 102 that the reseller ordered are associated with the reseller's subscription data in database 18 and shipped or provided to the reseller (506). From here, the reseller may log in to system 10 through the website, and the reseller may view and manage the reseller's account including the reseller's subscription data, tag orders, and the tag unique identifiers 110 of purchased tags associated with the reseller's account. Optionally, the reseller may order or purchase additional sheets 100 of tags 102 subject to administrator approval.

Preferably, the reseller may log in to system 10 through the website to track the registration status of tags 102 applied to the reseller's products that were purchased by users. The registration status of the tags may be displayed as either registered or active, or as unregistered or inactive. Preferably, at the time when the tags are provided to the reseller, the registration status of each tag is displayed by default as unregistered until a user has registered or activated a tag with system 10. Alternatively, the tags may be pre-associated with the reseller in database 18 as registered or active tags without requiring the tags to be separately registered or activated by users.

After the reseller receives the one or more sheets 100 of tags 102, the reseller attaches or adheres the tags 102 to the products that the reseller is selling (508), and the user purchases or obtains one or more of the reseller's tagged products (510). Moreover, the system 10 provides a hyperlink for the reseller to send to the user, which the user may then activate to subscribe to system 10 and order tags associated with the reseller. After activating the hyperlink, the user then subscribes to system 10 using the subscription process referenced with respect to FIG. 6. More specifically, the user provides subscription data including the user's name, address, e-mail address, phone number, and billing information to system 10, for example, using a website of system 10. Moreover, the user may also optionally and simultaneously register the tag (512). For example, the user may submit unique identifier 110 to system 10 to register the tag with system 10. In this way, the system 10 allows the reseller to track the registration status of the tags on the reseller's products.

In one embodiment, users and other subscribers including fundraisers and resellers must annually renew their subscription to system 10 in order to continue using the lost and found system. Alternatively, the system 10 may require subscribers to renew their subscription bi-annually, monthly, or at any other predetermined time. If a subscriber does not timely renew their subscription to system 10, then the tags provided to the user are deactivated and subsequently rendered inoperative until the subscription is renewed.

Figure 9:
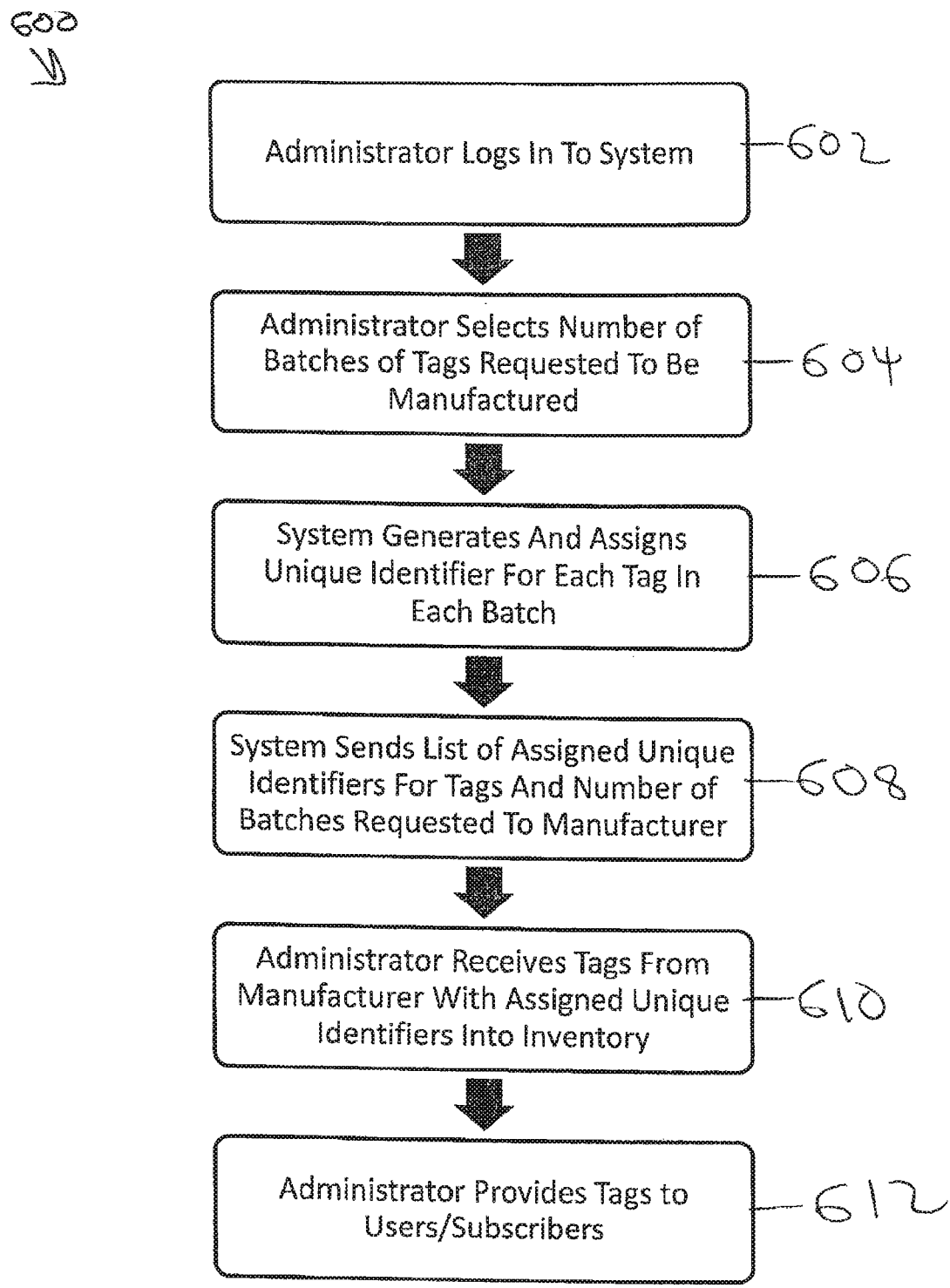
FIG. 9 is a schematic diagram of an exemplary process for creating tags for manufacture.

FIG. 9 illustrates a method 600 for creating sheets 100 of tags 102 to be provided to users. First, an administrator of system 10 logs in to a website associated with system 10 (602). The administrator then selects a preferred number of sheets 100 that the administrator requests for manufacture, for example, using a website submission form (604). Additionally, the administrator may also select a preferred number of tags 102 for each sheet 100 requested for manufacture.

Next, the administrator selects an option for the system 10 to generate and assign a unique identifier 110 for each tag 102 in each requested sheet 100 (606), for example, through a button on a website submission form. Alternatively, the system 10 may automatically generate and assign the unique identifiers 110 for each tag 102 in each requested sheet 100 immediately after the administrator completes step 604. In the preferred embodiment of the present invention, the system generates the unique identifiers 110 for each tag 102 by combining a phone number 106 obtained from a provider of the IVR system with a randomly generated unique code 108 for each tag. Once the unique identifiers 110 are successfully generated, the system 10 creates a report assigning each unique identifier 110 to a specific tag 102 in each sheet 100, for example, in the form of a list or spreadsheet. Additionally, in the embodiment where the tags are inoperative until activated by the user or subscriber, the system 10 generates a registration code 112 for each sheet 100 and includes the registration codes 112 in the report.

After the unique identifiers 110 are generated and assigned to each tag 102, the administrator sends the report created in step 606 with the requested number of sheets 100 to the manufacturer (608). Preferably, system 10 transmits the report to the manufacturer electronically, for example, when a button on the website is pressed; alternatively, the administrator may manually mail the report to the manufacturer. After the manufacturer receives the report, the manufacturer prints the labels 104 of the tags based on the report and the registration code 112 for each sheet and ships the sheets 100 of tags 102 back to the administrator of system 10. Once the administrator receives the sheets 100 of tags 102 from the manufacturer with registration codes 112 and labels 104 displaying the tags' assigned phone numbers 106 and unique codes 108, the tags are placed into inventory (610). Afterwards, whenever an entity or subscriber such as a user, fundraiser, or reseller subscribes to system 10, the administrator takes one or more sheets 100 of tags from inventory and provides the tags 102 to the subscriber to be applied on a user's items (612).

While certain embodiments have been illustrated and described herein, those embodiments are not necessarily to be construed as advantageous over other embodiments for implementing the method and system of the present subject matter. Other variations and equivalents are possible and should be considered within the scope of the present subject matter.

What is claimed is:

1. A system for facilitating the recovery of a lost item of a user from a finder, the system comprising:

one or more tags for an item of the user, wherein each tag includes a label that displays a unique identifier including a phone number and a unique code, wherein the phone number is associated with an interactive voice response system, and wherein the unique code identifies the tag;

a server connected to a network, the server including a processor and a memory, wherein the processor is in communication with the interactive voice response system over the network, and wherein the memory is configured to store data received from the interactive voice response system;

a database connected to the server, the database storing data including the unique identifier of the one or more tags; and computer-readable instructions stored in the memory that when executed on the processor, cause the processor to facilitate the recovery of a lost item of a user by performing the following steps:

receiving the phone number and unique code of the one or more tags for the item into the server from a finder of the item in communication with the interactive voice response system, wherein the phone number and unique code are received into the server through an interactive voice response application programming interface, and wherein the phone number and unique code are combined to form the unique identifier;

storing the unique identifier of the one or more tags into the memory of the server;

comparing the unique identifier received from the interactive voice response system with the data stored in the database to verify if a matching unique identifier exists; and generating a response including the phone number associated with the matching unique identifier and transmitting the response to the interactive voice response system to obtain an audio message from the finder indicating the location of the item, to call the phone number associated with the matching unique identifier, and to play the audio message.

2. The system of claim 1, wherein the server is located in a virtual private cloud.

3. The system of claim 1, wherein the computer-readable instructions further cause the processor to perform the following steps:

receiving the phone number and unique code of the one or more tags from the finder into the memory through a website on the server, wherein the phone number and unique code are combined to form the unique identifier;

comparing the unique identifier received from the finder with the data stored in the database to verify if a matching unique identifier exists;

receiving a written message from the finder indicating the location of the item; and transmitting the written message to the user associated with the matching unique identifier.

4. The system of claim 1, wherein the phone number associated with the matching unique identifier is selected from the group consisting of a phone number of the user and a phone number of the user's notification recipient.

5. The system of claim 1, wherein the computer-readable instructions further cause the processor to perform the following steps:

receiving the audio message of the finder indicating the location of the item into the server through the interactive voice response application programming interface;

storing the audio message of the finder into the memory of the server;

storing a file location path to the stored audio message in the database;

creating a written message that includes a hyperlink to the file location path of the audio message; and sending the written message with the hyperlink indicating the location of the item to the user, wherein the audio message is played when the user activates the hyperlink.

6. A system for facilitating the recovery of a lost item of a user from a finder, the system comprising:

one or more tags for an item of the user, wherein each tag includes a label that displays a unique identifier including a phone number and a unique code, wherein the phone number is associated with an interactive voice response system, and wherein the unique code identifies the tag;

a web server connected to an Internet network, the web server including a processor and a memory, wherein the processor is in communication with the interactive voice response system over the Internet network, and wherein the memory is configured to store data received from the interactive voice response system;

a database connected to the web server, the database storing data including the unique identifier of the one or more tags;

a virtual private cloud including one or more virtual servers, a public network in communication with the Internet network and the one or more virtual servers, a private network in communication with the public network, and one or more network interfaces controlling network traffic to and from the one or more virtual servers within the public network and the private network, wherein the one or more virtual servers includes the web server and the database; and computer-readable instructions stored in the memory that when executed on the processor, cause the processor to facilitate the recovery of a lost item of a user by performing the following steps:

receiving the phone number and unique code of the one or more tags for the item into the web server from a finder of the item in communication with the interactive voice response system, wherein the phone number and unique code are received into the web server through an interactive voice response application programming interface, and wherein the phone number and unique code are combined to form the unique identifier;

storing the unique identifier of the one or more tags into the memory of the web server;

comparing the unique identifier received from the interactive voice response system with the data stored in the database to verify if a matching unique identifier exists; and generating a response including the phone number associated with the matching unique identifier and transmitting the response to the interactive voice response system to obtain an audio message from the finder indicating the location of the item, to call the phone number associated with the matching unique identifier, and to play the audio message.

7. The system of claim 6, wherein the computer-readable instructions further cause the processor to perform the following steps:

receiving the phone number and unique code of the one or more tags from the finder into the memory through a website on the web server, wherein the phone number and unique code are combined to form the unique identifier;

comparing the unique identifier received from the finder with the data stored in the database to verify if a matching unique identifier exists;

receiving a written message from the finder including information indicating the location of the item; and transmitting the written message to the user associated with the matching unique identifier.

8. The system of claim 7, wherein the information indicating the location of the item in the written message include the name of the location, the address of the location, and pickup instructions for the item.

9. The system of claim 7, wherein the website displays a history of previously recorded audio messages and written messages associated with the one or more tags for the user to hear and view, respectively.

10. The system of claim 9, wherein the history of previously recorded audio messages and written messages are removed after a predetermined period of time.

11. The system of claim 6, wherein the phone number associated with the matching unique identifier is selected from the group consisting of a phone number of the user and a phone number of the user's notification recipient.

12. The system of claim 6, wherein the computer-readable instructions further cause the processor to perform the following steps:
receiving the audio message of the finder indicating the location of the item into the web server through the interactive voice response application programming interface;
storing the audio message of the finder into the memory of the web server;
storing a file location path to the stored audio message in the database;
creating a written message that includes a hyperlink to the file location path of the audio message; and
sending the written message with the hyperlink indicating the location of the item to the user, wherein the audio message is played when the user activates the hyperlink.

13. A method for facilitating the recovery of a lost item of a user from a finder, the method comprising:
providing one or more tags to a user for an item, wherein each tag includes a label that displays a unique identifier comprising a phone number and a unique code, wherein the phone number is associated with an interactive voice response system, and wherein the unique code identifies the tag;
receiving the phone number and unique code of the one or more tags for the item into a server from a finder in communication with the interactive voice response system, wherein the phone number and unique code are received into the server through an interactive voice response application programming interface, and wherein the phone number and unique code are combined to form the unique identifier;
storing the unique identifier of the one or more tags into a memory of the server;
comparing the unique identifier received from the interactive voice response system with data stored in a database to verify if a matching unique identifier exists, the database storing data including the unique identifier of the one or more tags; and
generating a response including the phone number associated with the matching unique identifier and transmitting the response to the interactive voice response system to obtain an audio message from the finder indicating the location of the item, to call the phone number associated with the matching unique identifier, and to play the audio message.

14. The method of claim 13, wherein the phone number associated with the matching unique identifier is selected from the group consisting of a phone number of the user and a phone number of the user's notification recipient.

15. The method of claim 13, further comprising:
receiving the phone number and unique code of the one or more tags from the finder into the memory through a website on the server, wherein the phone number and unique code are combined to form the unique identifier;
comparing the unique identifier received from the finder with the data stored in the database to verify if a matching unique identifier exists;
receiving a written message from the finder indicating the location of the item; and
transmitting the written message to the user associated with the matching unique identifier.

16. The method of claim 13, further comprising:
receiving the audio message of the finder indicating the location of the item into the server through the interactive voice response application programming interface;
storing the audio message of the finder into the memory of the server;
storing a file location path to the stored audio message in the database;
creating a written message that includes a hyperlink to the file location path of the audio message; and
sending the written message with the hyperlink indicating the location of the item to the user, wherein the audio message is played when the user activates the hyperlink.

17. The method of claim 13, further comprising:
obtaining subscription data from an entity selected from the group consisting of a user, a fundraiser with whom the user is participating, and a reseller of the item obtained by the user;
storing the subscription data in the database; and
associating the one or more tags in the database with the subscription data.

18. The method of claim 13, further comprising:
receiving the phone number for the one or more tags from a provider of the interactive voice response system; and
generating the unique code for the one or more tags at the server.

19. The method of claim 13, further comprising:
generating a registration code for activating the one or more tags;
providing the registration code to the user; and
activating the one or more tags in response to receiving the registration code from the user.

20. The method of claim 13, wherein the one or more tags are pre-activated before being provided to the user.

* * * * *